Jan. 4, 1938. G. A. LYON 2,104,235
TIRE COVER
Filed Dec. 24, 1935 3 Sheets-Sheet 3
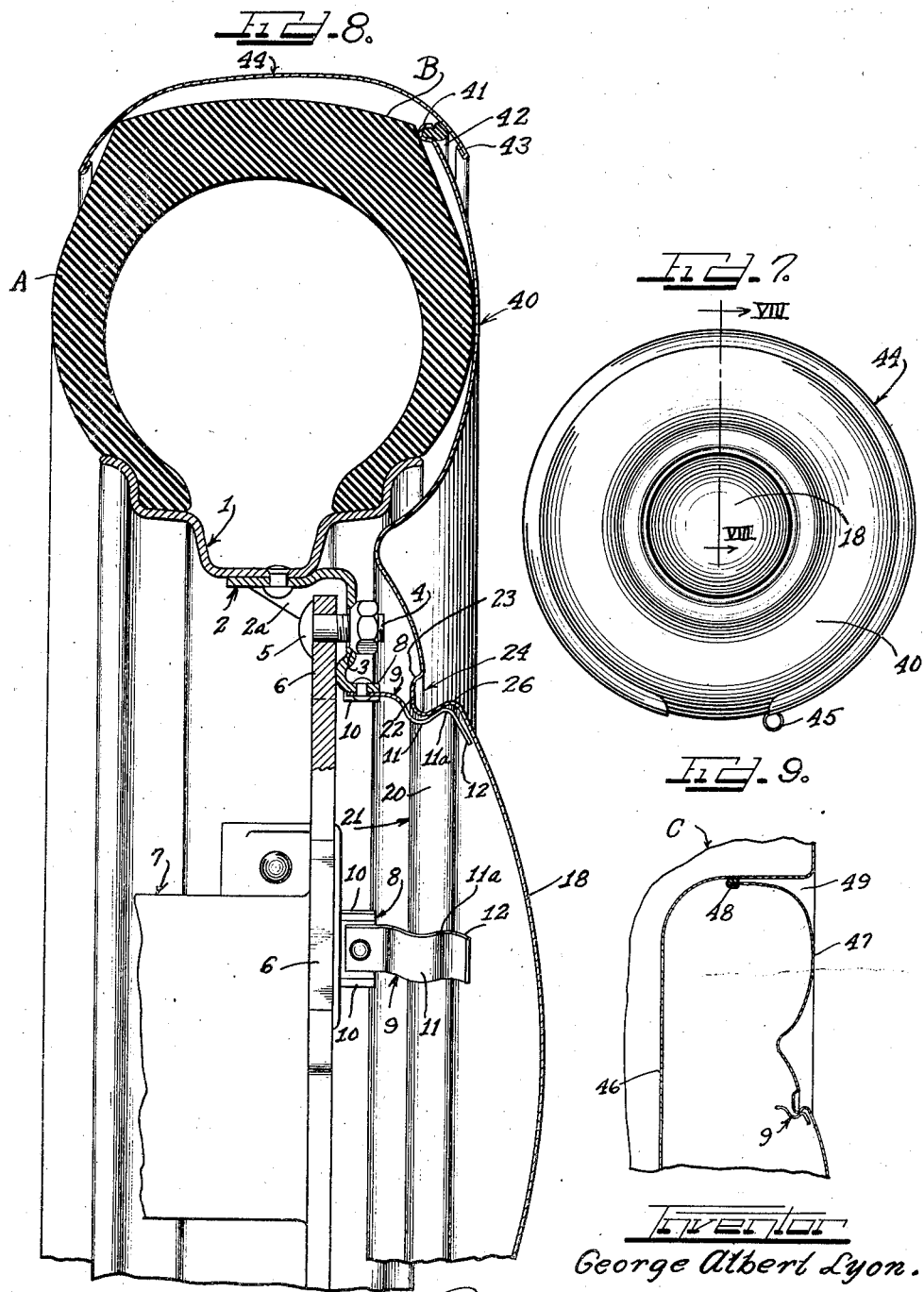

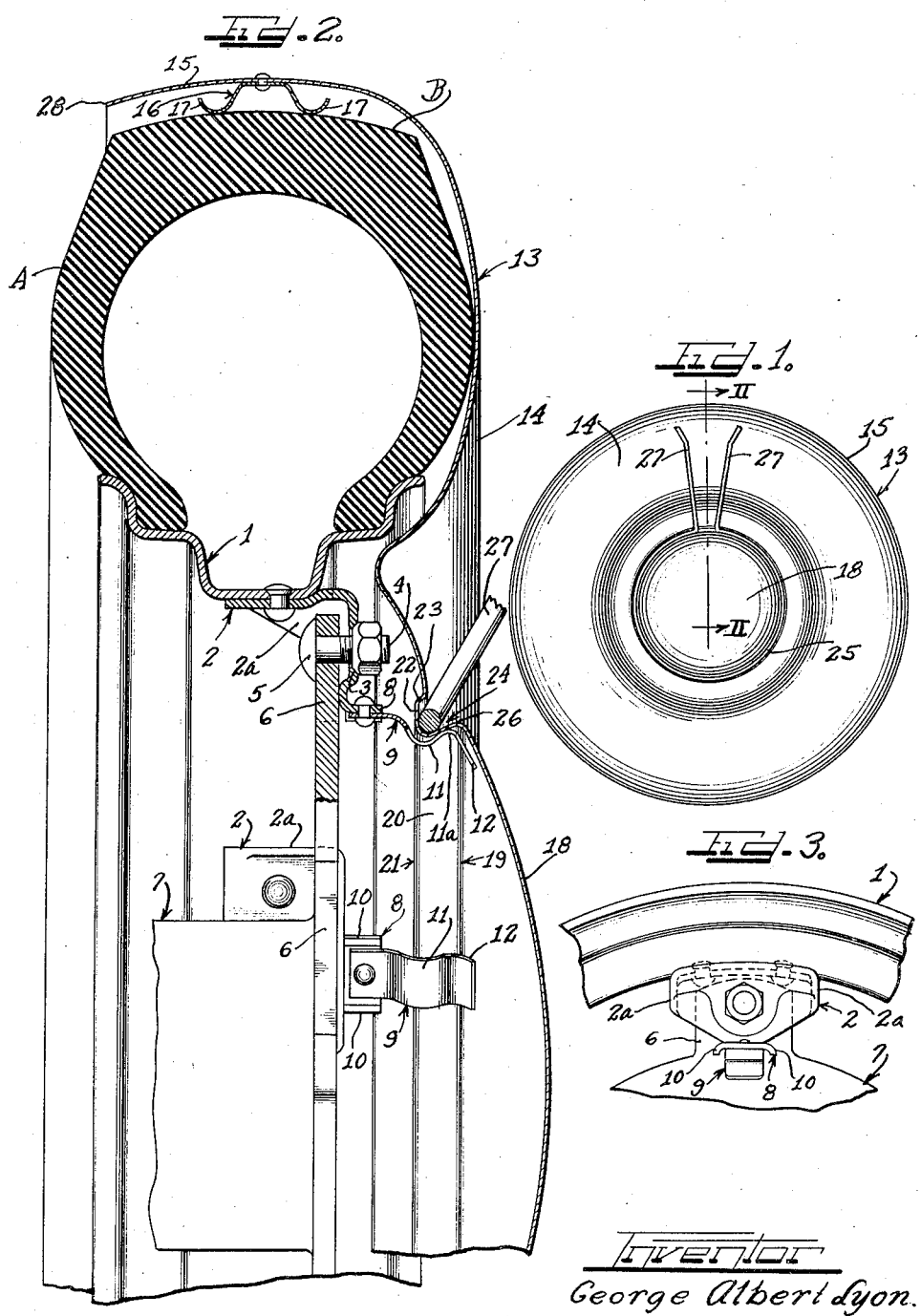

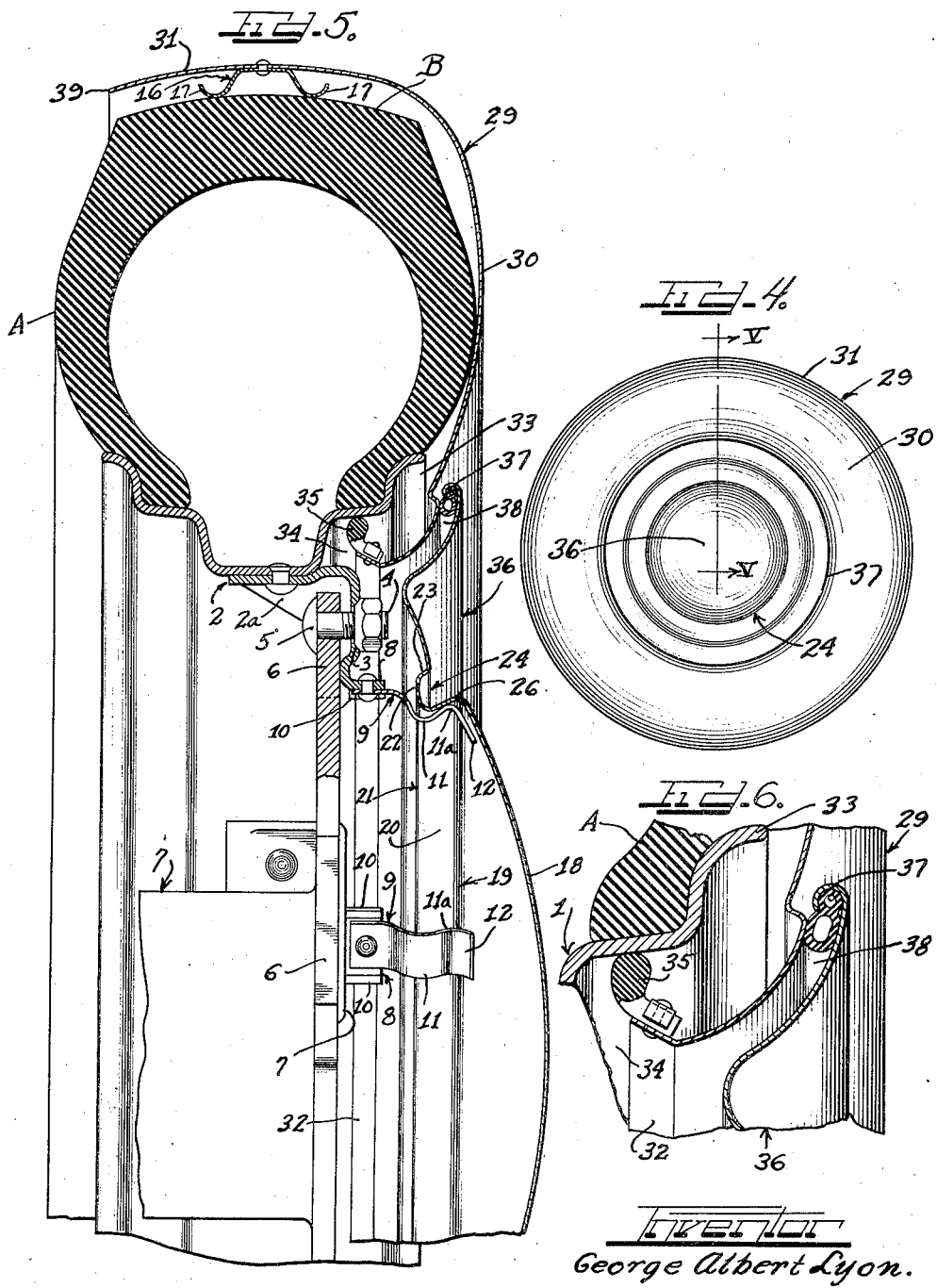

Patented Jan. 4, 1938

2,104,235

UNITED STATES PATENT OFFICE 2,104,235

TIRE COVER

George Albert Lyon, Detroit, Mich., assignor to Lyon Incorporated, Detroit, Mich., a corporation of Delaware Application December 24, 1935, Serial No. 56,066

7 Claims. (Cl. 150—54)

This invention has to do with tire covers and is concerned more particularly with a tire cover adapted to be snapped into and out of proper tire protecting position with substantially a single movement in each case.

It is an object of the invention to provide a wheel with retaining means which serves not only to mount a hub cap thereon but also serves to mount a tire cover in proper tire protecting position.

It is another object of the invention to provide a wheel with retaining means and a tire cover with cooperating retaining means whereby the cover is constantly drawn inward against the tire and capable of cooperating with tires of different widths.

It is a further object of the invention to provide a tire cover with guide means to readily guide the cover into cooperating relation with cover retaining means.

It is a further object of the invention to provide a wheel with tire cover retaining means cooperating with complemental means on the cover arranged so as to be entirely concealed when the cover is mounted in proper tire protecting position.

It is another object of the invention to provide a tire cover with means adapted to cooperate with retaining means on a wheel so as to be retained in proper tire protecting position, said means on the cover forming a recess adapted to receive a tool for readily removing the cover from the retaining means.

A further object of the invention involves the provision of means for enabling a tire cover to be mounted into and removed from proper tire protecting position with a snap action.

Another object of the invention involves the provision of a tire cover adapted to be yieldably held in proper tire protecting position, with a reentrant groove shaped to detachably receive a removing tool whereby the cover may be readily removed, thus obviating the necessity for any handle as a part of the cover structure.

Another object of the invention involves the provision of a unitary one-piece drum-like tire cover member shaped to cover the entire front of the spare wheel and tire, terminating at the outer periphery of the tire, or continuing transversely across the tread of the tire, and provided with means in cooperation with the wheel to attach the cover in proper tire protecting position.

Another object of the invention resides in the provision of yieldable tire cover retaining means so formed as to readily permit the cover to be shoved into retained cooperation therewith, yet sufficiently resistant to require the employment of a tool in order to enable the cover to be pried off such retaining means.

The invention contemplates the further provision of a multi-part tire cover including an outer tire covering part and an inner wheel covering part adapted to be overlapped together with retaining means for retaining the inner member which thus serves to also retain the outer member.

It is a further object of the invention to provide a vehicle body with a substantially circular well for retaining a spare wheel and tire and the outer periphery of a tire cover, and retaining means for holding the cover in proper tire protecting position, the body thus preventing access to the said covering part of the tire while the cover is retained in position.

In accordance with the general features of the invention, a wheel is provided with hub cap retaining means formed to be readily cammed into a reentrant groove of the cap but sufficiently stiff to thereafter prevent convenient removal of the cap without the employment of a tool. In accordance with the invention, there is provided a tire cover formed to protect the tread and outer side wall of the tire and to also cover the wheel. The cover member at its central portion is provided with a circular reentrant groove forming a rib adapted to cam the springs aside and then allow the springs to snap into the groove and not only hold the cover tightly, but also to press the cover against the tire and enable the cover to accommodate tires of different widths. The said covering portion of the tire is preferably provided with engaging springs yieldable radially to accommodate tires of different diameters, and having a yieldable cam portion adapted to engage the tread adjacent the outer side wall and thereby properly center the cover so that it may be readily shoved onto and snapped over the retaining springs. The cover is formed with an exterior reentrant groove adjacent its interior reentrant groove, if desired, adapted to receive a tool in the form of a resilient split ring which may be snapped into said outer groove. Said split ring is provided with an outwardly offset handle which may be grasped not only to hold the same in the outer groove but to enable the person grasping the same to exert an outward pull sufficient to remove the cover from the retaining springs.

In accordance with another form of the invention, the cover structure may be of the two-piece type, embodying a side plate adapted to extend to the outer periphery of the outer side wall of the tire, and a split resilient tread covering ring of the Lyon type which assists in pressing the side plate against the tire.

In accordance with further forms of the invention, the cover structure may be formed of a plurality of parts coacting in such a manner as to cover the outer side of the wheel and tire and also the tread of the tire. Such modified structure may include an inner part overlapped by an outer part, or vice versa.

In accordance with another form of the invention, the vehicle body may be provided with a well of generally circular form adapted to receive the rear of the spare wheel, tire and tread covering rim of the cover, preferably in such a manner as to prevent access of the fingers or a tool to the rear of the tire cover rim.

It is evident that the tire cover structure is extremely simple, the parts cooperating with the retaining means being in one piece if desired, and being so constructed in cooperation with retaining means as to resist or be substantially free from theft unless a special tool for removing the same be employed.

Other objects and advantages of the invention will appear as the description proceeds.

This invention (in preferred forms) is illustrated in the drawings and hereinafter more fully described.

Figure 1 is an elevational view showing the front of one form of the invention, applied in proper tire protecting position.

Figure 2 is an enlarged fragmentary view, partly in section and partly in elevation, taken substantially as indicated by the line II—II in Figure 1.

Figure 3 is a fragmentary elevational view of the front of a wheel, a support therefor, and tire cover retaining means.

Figure 4 is a view similar to Figure 1 but of a modified form of the invention.

Figure 5 is an enlarged fragmentary view, partly in section and partly in elevation, taken substantially as indicated by the line V—V in Figure 4.

Figure 6 is a further enlarged view showing details of the cover structure and cooperating wheel structure appearing in Figure 5.

Figure 7 is a view similar to Figure 1 but of a still further modified form of the invention.

Figure 8 is an enlarged fragmentary view, partly in section and partly in elevation, taken substantially as indicated by the line VIII—VIII in Figure 7.

Figure 9 shows another form of the invention.

Referring now more particularly to the drawings, there is illustrated at 1 a wheel which may be of drop-center type, provided with forwardly extending wheel attaching lugs 2, preferably five in number although any other suitable number of lugs, preferably equally spaced circumferentially, may be provided. Each lug is provided with a hole adapted to receive loosely the threaded shank 4 of an attaching bolt 5 preferably permanently united with a corresponding arm 6 extending from a support spider 7. It is to be appreciated of course that the support device 7 may take any form, the arms 6 being provided in view of the form of the lugs 2, having side flanges 2a for strength. It is also to be appreciated that the support 7 may be mounted on the automobile at the rear or at either side or at any other suitable part of the vehicle.

Each lug 2 at its forward side is provided with a forward extension 8 to which is riveted, spot-welded or otherwise fixedly secured a retaining spring 9. To prevent any likelihood of turning of the spring 9, the projection 8 is preferably provided with flanges 10. Each spring 9 has an inward U-bend 11 forward of the place of securement of the spring, and the front extremity of the spring beyond the U-bend is extended inwardly and at an angle to provide a cam portion 12.

A cover made in accordance with one form of the invention is shown in Figures 1 and 2. It is formed of a single piece of metal as is apparent at 13 in Figure 2, comprising a side plate portion 14 and a tread covering portion 15. The side portion 14 is adapted to engage the outer side wall of the tire A, and the cover is formed in cross section to simulate generally the cross-sectional contour of the tire and the spare wheel with attached hub cap as the same are used in service supporting an automobile. The rim portion 15 of the cover is preferably of such a diameter as to be substantially spaced from the tread of the smallest tire adapted for use with the same nominal size wheel, so as to be enabled to accommodate tires of different diameters. The rim portion 15 is held in suitably spaced and anti-rattling relation to the tire tread by a circumferential series of springs 16. Six springs, more or less, may be employed and they are preferably spaced equally circumferentially within the cover rim 15. While the springs 16 may take any form, they are preferably formed as shown in Figure 2, having free ends 17 curved outwardly to provide rounded cam portions adapted to ride on the tread so as not to bite thereinto as the cover is shoved rearwardly and forwardly over the tread of the tire.

The side portion 14 of the cover is preferably bulged forwardly at the center thereof as shown at 18 to provide a part in general simulation of the hub cap. The material of the side portion 14 at the periphery of the central part 18 is bent inwardly and rearwardly to provide a recess 19 and an adjacent inclined wall 20. The wall 20 terminates rearwardly in a rounded edge 21 from which the material of the side portion 14 extends radially outwardly at 22 and then slightly forwardly at 23 before continuing on outwardly toward the tread covering portion 15. The cover portions 20, 22 and 23 form an exterior reentrant groove 24 whose function will appear as the description proceeds.

The rounded edge 21 is so dimensioned as to be engageable with the end portions 12 of the springs 9 so as to cam said springs radially inwardly and snap into the U-bends 11. This brings the outer bends 11a of the springs 9 into engagement with the wall 20 with the springs under considerable stress, exerting a camming force upon the wall 20 in a direction to press the side portion 14 firmly against the outer side wall of the tire A. The pressure exerted by the springs 9 in forcing the cover against the tire is such as to prevent rattling and require substantial force to withdraw the cover from the springs 9. It will be observed that substantial clearance is provided between the rear margin 21 of the wall 20 and the adjacent rear part of each spring 9 so that there will be no interference with the pressure exerted by the spring 9 in forcing the cover 13 against the tire. This clearance is moreover preferably of such extent as to allow the spring portion 11a to engage more or less deep portions of the wall 20 in order that the cover 13 may be forced into firm engagement with the outer walls of tires of different widths.

It is preferred that no hooks, handles or the like be secured visibly on the cover 13 as they tend to detract from the appearance of the cover. The cover 13 may nevertheless be readily removed upon the employment of a special removing device. This device may comprise a split ring 25 preferably of wire of such size as to fit in the groove 24. The ring 25 is preferably resilient and normally of a diameter to embrace the wall 20 at the bottom of the groove 24, thus requiring expansion of the ring to enable it to pass transversely over the outer periphery 26 of the bulged portion 18. The ends 27 of the ring 25 are bent at an angle to and on the same side of the plane of the ring, providing a handle which may be grasped and upon which a pull may be exerted conveniently to draw the cover wall 20 off the springs 9 in the removal of the cover. This same ring may be employed in handling the cover while the same is being positioned in proper tire protecting position, although it may be conveniently dispensed with in such event as it is a relatively simple matter to simply shove the cover, snapping the same into cooperative relation with the springs 9, once the rim portion 15 is placed about the tread of the tire.

In applying the cover to the tire and wheel assembly, the springs 16 are of assistance. When the cover 13 is first to be applied, it is positioned with the rear margin 28 of the rim 15 disposed about the forward part B of the tread of the tire. At this stage, the upper part of the margin 28 being engaged with the tire at B, it is clear that the cover 13 is arranged eccentrically to the tire. As the shoving of the cover 13 rearwardly is continued, the rear ends 17 of the springs 16 engage the front edge of the tire tread at the upper part of the tire and cause the upper part of the cover to be cammed outward, bringing all of the spring ends 17 into engagement with the forward portion B of the tread of the tire. When this occurs, the rim portion 15 of the cover is substantially coaxial with the wheel 1 and tire A. Then, as the rear shoving of the cover 13 is continued, the rear edge portion 21 of the wall 20, being aligned with the cam portions 12 of the springs 9, engage said cam portions and cam them inwardly until said edge 21 passes rearwardly over the hump 11a in the springs 9. At this point, the springs 9, in their tendency to resume their normal positions, exert a rear camming force upon the inclined wall 20, and thus complete the movement of the cover into position, snapping the same firmly against the front wall of the tire A. It is thus evident that the springs 16 serve not only to accommodate the cover to tires of different tread diameters, but also serve as guiding and centering means to bring the cover into proper cooperating relation to the springs 9 so that the latter may serve to firmly secure the cover in place.

It is also evident from the foregoing that the formation including the wall 20 enabling the cover to properly cooperate with the springs 9 also results in the provision of the groove 24 which enables a special removing tool to be applied when it is desired to conveniently remove the cover, and yet none of this structure detracts from the appearance of the cover. Rather, the effect is one of enhancing the appearance of the cover since the portion 20 is circumferential and the outer periphery 26 of the bulged part 18 has an ornamental bead-like appearance.

While in the illustrated embodiment of the invention five cover retaining springs 9 are employed, obviously any other greater or smaller number may be arranged preferably equidistant from one another and capable of affording suitable support of the cover on the wheel and tire assembly.

It will be appreciated that the reentrant groove 24 could be of the inwardly open type instead of outwardly open as illustrated in Fig. 2, and the springs 9 could be arranged with the portions 11, 11a and 12 reversed and the wall 20 likewise could be reversed in inclination so that the springs 9 would be cammed outwardly and exert an inward force upon the modified wall construction of the cover 13. Such reversal of parts would effect the same results, although the arrangement illustrated is preferred.

The form of the invention appearing in Figures 4, 5 and 6 is the same as that shown in Figures 1, 2 and 3 except that the cover structure instead of being made in one piece is made in two pieces, one of which is formed to cover the outer wall and tread of the tire and the other is formed to cover the outer side of the wheel. The spring and associated structure for holding the wheel covering part are the same as previously described and accordingly like members will be employed for these parts.

The outer cover member 29 comprises a side wall covering portion 30 adapted to engage the outer side wall of the tire, and a rim portion 31 adapted to extend across and substantially completely cover the tread of the tire. Springs 16 are provided within the rim portion 31 as within the rim portion 15 in the form of the invention shown in detail in Figure 2. These springs are provided with end portions 17 having substantially the same function and operating in substantially the same way as the spring ends 17 described in connection with Figure 2, except that instead of centering the member cooperative with the springs 9, it centers the inner peripheral portion 32 of the cover member 29 in proper relation to the rim of the wheel 1, as will appear hereinafter.

The outer cover member 29 preferably extends inwardly to a sufficient extent to somewhat overlap the rim 33 of the wheel 1. Said rim is provided with an intermediate ledge or wall 34 which preferably converges rearwardly to a slight extent to provide a wedge surface snugly engageable with yieldable rubber or other gripping centering elements 35 secured in a series to the circular inner margin 32 of the cover 29. It will be observed that substantially prior to engagement of the wall 34 by the cushioning elements 35, the rear end 17 of each spring 16 is engageable with the forward part B of the tread of the tire, thus arranging the series of elements 35 in substantially coaxial relation to the wall 34. Thereafter, as the cover 29 continues to be shoved transversely of the tire, the elements 35 engage the wall 34 with a wedging action, somewhat compressing the elements 35 and providing a substantial frictional contact which serves together with the contacts of the springs 16 with the tire tread to hold the cover member 29 tightly in proper tire protecting position. If desired, the elements 35 could be omitted and reliance placed on the springs 16 to hold the cover member 29 in place. Or, if desired, the springs 16 may be omitted and reliance placed on the elements 35 to hold the cover member in place.

The inner cover member has its central portion formed substantially the same as the central portion of the cover member 13 previously described, and accordingly like numerals are employed. This section, designated by the reference numeral 36, has its outer periphery 37 arranged to extend in front of and somewhat overlap the cover member 29 and is clinched onto a cushion bead 38 preferably of resilient rubber or the like. Said bead 38 is adapted to be compressed against the cover member 29 when the springs 9 are engaged with the wall 20 and exerting a rearward pressure on the inner cover member 36 to firmly hold the same in position. Here, as in the previously described form of the invention, suitable clearance is provided in order that the outer cover member 29 may occupy different positions axially of the wheel for engagement with the outer walls of tires of different widths. The springs 16 serve as anti-rattlers, as do the cushion elements 35, the bead 38 and the springs 9. Yet the springs 9 are of such character as to exert sufficient pressure to firmly hold the cover parts in position.

The cover may not of course be removed unless the inner member 36 is removed. Its removal may be effected by the use of a tool 25 and in a manner previously described. Thereafter the cover member 29 may be grasped as at the rear edge 39 on the rim 31 and pulled off the tire and wheel assembly.

In accordance with a still further form of the invention, there is provided a side plate and split spring ring of the Lyon type. The side plate, shown at 40, is in the form of a disc terminating substantially at the forward part B of the tread of the tire A and carries a cushion strip or bead 42 of resilient rubber or the like shown at 42 for engagement with the inner surface of the overlapping outer margin 43 of a resilient split ring 44. The ring 44 is formed to cover the tread of the tire, and at an end thereof may be provided with a hook or ring 45 which is adapted to be grasped to facilitate application and removal of the rim member 44.

The inner portion of the side plate 40 may be shaped substantially the same as the corresponding portions of the members 13 and 36 previously described, and accordingly like numbers for the associated parts are used.

Obviously, the cover member 40 may not be removed until the split rim 44 is removed. Removal of the rim 44 of course involves merely an expansion of the member, in view of the resilience thereof. After the member 44 is removed, a tool such as 25 previously described may be inserted in the reentrant groove 24 and the handles thereof grasped and pulled outwardly. In applying the cover structure, obviously the side plate 40 is positioned against the tire by shoving the same axially to snap over the springs 9, the latter serving to hold the cover member 40 tightly in engagement with the tire A. Here, as in the forms previously described, ample clearance is provided to enable the plate 40 to engage tires of different widths. In applying the member 40, it may be engaged at its peripheral portion 41 by the hands and may be guided by the fingers into substantially coaxial relation with the tire so that the edge 21 of the wall 20 will readily engage the springs 9 and snap onto the same. Here, again, if desired, the tool 25 may be employed for convenience. After the plate 1 is in position, the split rim 44 may be applied in the usual manner to the position shown in Figures 7 and 8.

In the form shown in Figure 9 the vehicle body C is formed with a substantially circular well 46 in the rear or any other part of the body, and shaped to receive the spare wheel and tire. A suitable wheel attaching bracket and associated means as shown in Figure 2 may be employed to support the wheel. The cover 47 may be held by the springs 9. A resilient cushion means 48 in strip or other form is secured in any suitable manner to the outer edge of the cover. The peripheral wall 49 of the well is preferably tapered somewhat to guide and wedgingly engage the cushion means 48 as and after the cover is shoved into proper tire protecting position. In this form of the invention, theft of the cover in the absence of a tool such as the tool 25 is prevented.

If desired, the tire valve stem (not shown) may be concealed behind any cover in accordance with the invention or the cover may be provided with an opening affording access to the stem while the cover remains in proper tire protecting position.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A cover formed to shield the outer side of a tire and provided with an annular reentrant groove for enhancing the appearance of the cover and for providing the cover with a rearwardly projecting annular flange adapted to be engaged by cover-retaining means, said cover having an outer peripheral means of such diameter as to engage guidingly the tire for guiding the cover into engagement with the retaining means.

2. In combination, a wheel having a tire thereon, a tire cover provided with an annular reentrant groove for enhancing the appearance of the cover and forming a rearwardly projecting annular flange, said wheel having retaining means thereon detachably engageable with said flange to hold said cover in desired tire protecting position, said cover having outer peripheral means of such diameter as to engage guidingly the tire for guiding the cover into engagement with said cover-retaining means.

3. A tire cover comprising a member shaped for disposition over the tread and a side wall of the tire, and a plate overlapping said member for holding it in proper position, said plate being provided with a reentrant groove for enhancing the appearance of the plate and for providing the plate with a rearwardly projecting annular flange adapted to be engaged by plate-retaining means.

4. A tire cover comprising a member shaped for disposition over the tread and a side wall of the tire, and a plate overlapping said member for holding it in proper position, said plate being provided with a reentrant groove for enhancing the appearance of the plate and for providing the plate with a rearwardly projecting annular flange adapted to be engaged by plate-retaining means, and means for supporting said member in said position pending the application of said plate.

5. A tire cover comprising a member shaped for disposition over the tread and a side wall of the tire, and a plate overlapping said member for holding it in proper position, said plate being provided with a reentrant groove for enhancing the appearance of the plate and for providing the plate with a rearwardly projecting annular flange adapted to be engaged by plate-retaining means, and means for preventing rattling between said member and said plate.

6. In a tire cover for a spare tire assembly including a spare wheel and tire, as well as spring retaining elements for holding a hub cap on the wheel, an outer face plate for disposition over the outer side of the wheel and tire having an annular depression extending radially inward at an angle, thus forming a reentrant groove, the rear and concealed side of said depression being so located relative to the wheel as to provide an annular shoulder spaced from the rear surface of the central portion of said cover plate and over which said spring elements may be snapped upon axial pressure being applied to said cover plate to mount the same in retained position on the wheel.

7. In an assembly including a spare wheel and tire as well as spring retaining elements for holding a hub cap in cooperation with the hub portion of the wheel, a tire cover provided with an outer face having an annular depression extending radially inward at an angle to form a reentrant groove, the rear and concealed side of said depression being positioned centrally of said assembly and opposite said retaining elements, and providing an annular shoulder the radial inner surface of which is positioned to be engaged by said spring elements when said cover face is axially pressed into position on the assembly.

GEORGE ALBERT LYON.